United States Patent
Prouty et al.

(10) Patent No.: US 6,844,510 B2
(45) Date of Patent: Jan. 18, 2005

(54) STALK SWITCH

(75) Inventors: Stephen Prouty, Providence, RI (US); Steven Kille, Amesbury, MA (US); Charles McCall, Plymouth, MA (US); Kevin Shell, Andover, MA (US); Jack Tseng, Canton, MA (US); Art Stephen, Milton, MA (US)

(73) Assignee: Stonebridge Control Devices, Inc., Canton, MA (US)

( * ) Notice: Subject to any disclaimer, the term of this patent is extended or adjusted under 35 U.S.C. 154(b) by 0 days.

(21) Appl. No.: 10/638,966

(22) Filed: Aug. 11, 2003

(65) Prior Publication Data

US 2004/0140185 A1 Jul. 22, 2004

Related U.S. Application Data

(60) Provisional application No. 60/402,503, filed on Aug. 9, 2002.

(51) Int. Cl.[7] .............................................. H01H 25/04
(52) U.S. Cl. ...................................... 200/6 A; 200/335
(58) Field of Search ........................... 200/4, 6 A, 17 R, 200/18, 332, 335

(56) References Cited

U.S. PATENT DOCUMENTS

| | | | | | |
|---|---|---|---|---|---|
| 3,898,397 | A | * | 8/1975 | Devore et al. | 200/6 A |
| 4,406,931 | A | * | 9/1983 | Dola | 200/6 A |
| 4,470,320 | A | * | 9/1984 | Kim | 74/471 XY |
| 4,604,502 | A | * | 8/1986 | Thomas | 200/6 A |
| 5,157,229 | A | * | 10/1992 | Wu | 200/6 A |
| 5,744,769 | A | * | 4/1998 | Proctor et al. | 200/61.54 |
| 5,952,631 | A | * | 9/1999 | Miyaki | 200/6 A |
| 6,034,336 | A | * | 3/2000 | Lee | 200/18 |
| 6,573,465 | B1 | * | 6/2003 | Doepner | 200/6 A |

* cited by examiner

*Primary Examiner*—Michael A. Friedhofer
(74) *Attorney, Agent, or Firm*—Grossman Tucker Perrealt & Pfleger, PLLC

(57) ABSTRACT

A stalk switch having an energy storage element disposed coxially about a handle to store energy when the handle is in a contact position and release energy to provide a force to drive the handle back to the neutral position from the contact position. The energy storage element may be a sleeve made of an elastomeric material. Such a sleeve may also provide for overload protection for contact closures of the switch. The stalk switch may also have at least one microswitch to align operation of a contact closure with actual motion of the handle.

13 Claims, 2 Drawing Sheets

STALK SWITCH

CROSS REFERENCE TO RELATED APPLICATIONS

This application claims the benefit of the filing date of U.S. Provisional Application Ser. No. 60/402,503, filed Aug. 9, 2002, the teachings of which are incorporated herein by reference.

FIELD OF THE INVENTION

The present invention relates generally to switches, and, more particularly to a stalk switch.

BACKGROUND OF THE INVENTION

Traditional designs for stalk switches include numerous complex components to (1) create the required circuitry for the contact closures, (2) guide the actuator to make the contact closures, (3) return the actuator to the neutral position, (4) hold the actuator in the neutral position, (5) transfer the actuation motion to the axis perpendicular to the contact closure, (6) meet the specified tactile feel requirements, (7) provide overload protection for the contact closures. Typically these designs include seven to eleven components; this complexity has significantly impacted the cost-effectiveness and reliability of such switches.

Accordingly, there is a need for a stalk switch that is cost-effective and reliable.

BRIEF SUMMARY OF THE INVENTION

A stalk switch consistent with the invention includes: a handle having a neutral position and at least one contact position; and an energy storage element disposed coaxially about the handle. The energy storage element is configured to store energy when the handle is in the at least one contact position and release energy to provide a force to drive the handle to the neutral position. The energy storage element may be a sleeve disposed about the handle or a spring.

In another embodiment, a stalk switch consistent with the invention includes: at least one contact closure; and at least one microswitch associated with the at least one contact closure, the at least one microswitch configured to align operation of the contact closure with actual motion of the handle.

In yet another embodiment, a stalk switch consistent with the invention includes: a handle configured to move in at least one plane; a first housing; and a second housing split on an axis parallel to the at least one plane.

BRIEF DESCRIPTION OF THE DRAWINGS

Advantages of the present invention will be apparent from the following detailed description of exemplary embodiments thereof, which description should be considered in conjunction with the accompanying drawings, in which.

DETAILED DESCRIPTION

Figure 1:
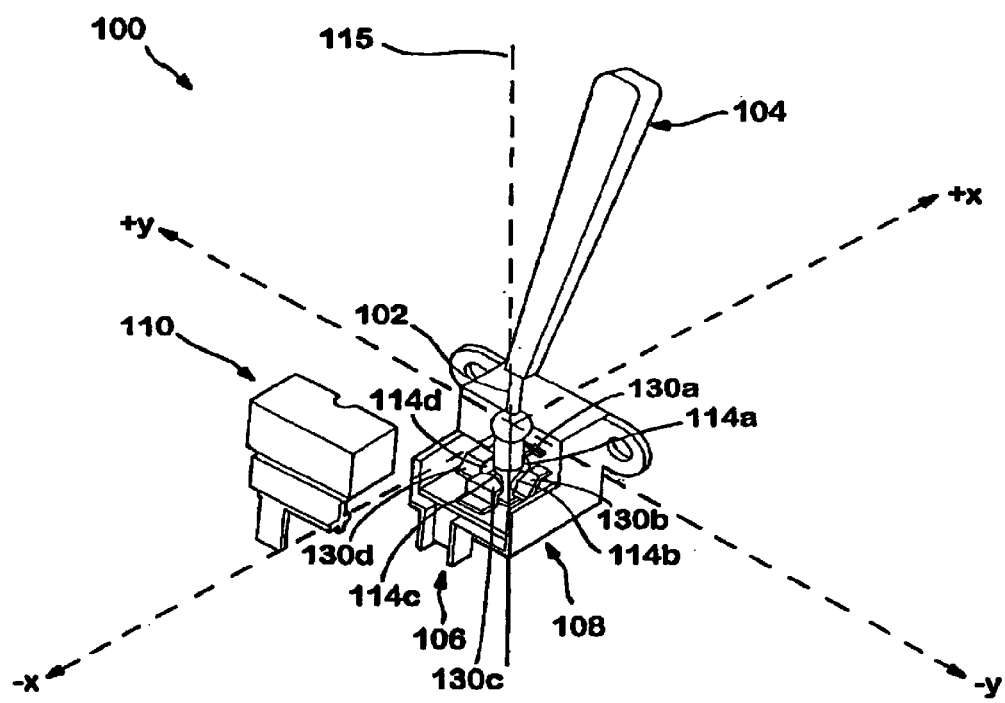
FIG. 1 is an exploded view of an exemplary stalk switch consistent with the invention.

Turning to FIG. 1, an exemplary stalk switch 100 consistent with the invention is illustrated. In general, the stalk switch 100 includes a handle 102, an energy storage element, e.g., a sleeve 104, disposed coxially about the handle 102, a printed circuit board (PCB) 106, a housing 108, and a cover 110. A plurality of contact closures 114a, 114b, 114c, and 114d may be equally spaced at about ninety degree intervals about a centerline axis 115 of the switch. The contact closures 114a, 114b, 114c, and 114d may be engaged and disengaged by translating the handle 102 in the +x, −x, +y, and −y directions.

A stalk switch 100 consistent with the invention may be utilized in a variety of systems and applications known in the art. One exemplary system is for use on a steering column of a vehicle so a driver of the vehicle can control a variety of functions with only the stalk switch. For example, a driver may push and pull the stalk switch in the x and y directions to control a variety of automobile functions, e.g., turn signals, high beams, low beams, windshield wiper speeds, etc. The stalk switch may activate another variety of automobile functions by rotation of an outer portion of the stalk switch.

The stalk switch 100 has a neutral position when the position of the handle 102 does not actively engage any of the contact closures 114a, 114b, 114c, 114d. This may occur in a variety of positions depending on how the handle is bent and in one embodiment may occur when the handle 102 is coincident with the centerline axis 115.

Advantageously, the stalk switch 100 has a handle 102 with an energy storage element coxially disposed therewith to provide a force to return and hold the handle 102 in the neutral position. In one embodiment, the energy storage element may be a sleeve 104 molded over the handle 102. In general, when the handle 102 is moved in the x or y direction a portion of the sleeve 104 contacts an upper portion of the housing 108 or the cover 110. The portion of the sleeve 104 that makes contact is compressed and energy is stored in the sleeve 104. At the desired time, the sleeve 104 is decompressed and energy is released in order to provide a force suitable to drive the handle 102 back to the neutral position.

Figure 2A:
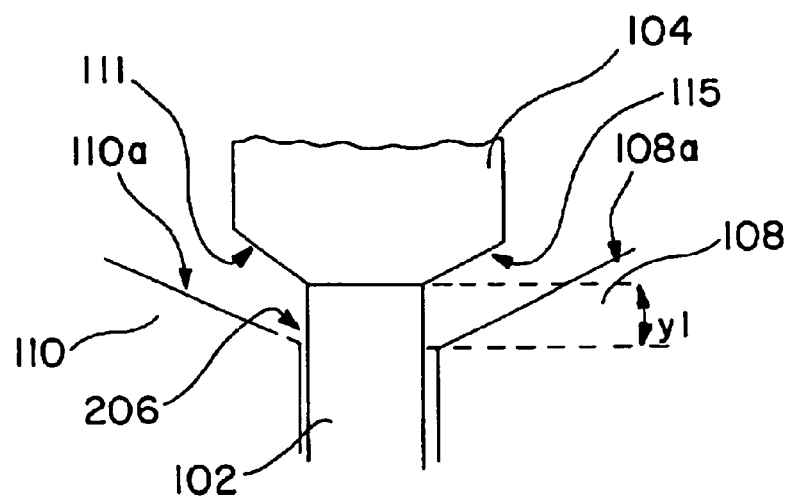
FIG. 2A is a cross sectional cutaway view of a switch consistent with the invention when the handle of the switch is in a neutral position.
Figure 2B:
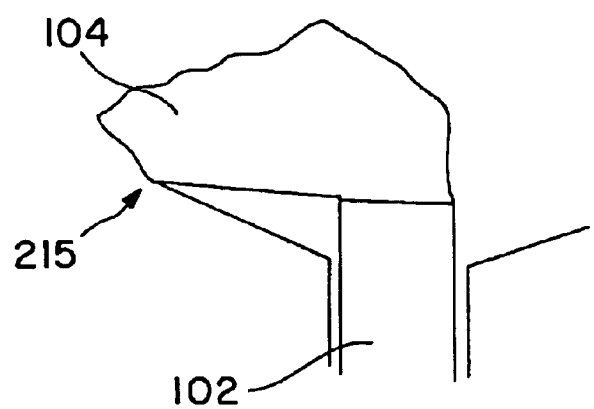
FIG. 2B is a cross sectional cutaway view of the switch of FIG. 2A when the handle is on one contact position.

Turning to FIG. 2A and 2B, a partial cross sectional view showing cooperation of the sleeve 104 and an outer portion of the housing 108 or cover 110 is illustrated in a neutral position (FIG. 2A) and in a contact position (FIG. 2B). The sleeve 104 may be made of any variety of elastomeric materials such as urethane or butadiene rubber to name only a couple. In a number of applications, an operator should be provided with a certain tactile feedback in order for the operator to determine whether the switch 100 has latched into a certain position to perform a desired operation. This tactile feedback may be a popping or snapping feel or a feel provided by a certain level of force.

To vary the tactile feedback for a given application, the sleeve's 104 dimensions and materials may be varied. For example, the durometer of the sleeve material may be varied, the thickness of the sleeve may be varied, and the outside diameter of the sleeve material may also be varied. As illustrated in FIG. 2A, the sleeve 104 may also have a tapered portion 111 and 115. Alternatively, or in addition, a top portion 110a of the cover 110 and a top portion 108a of the housing 108 may also be tapered. The distance y1 or the clearance gap between the between the bottom of the sleeve 104 and the opening 206 in the opening created by joining the cover 110 and housing 108 may also be varied. This distance y1 combined with the shape of the lower portion of the sleeve 104 and the top portions 108a, 110a of the housing and cover, among other things, dictate the distance the handle 102 has to travel in the x and y direction from the neutral position before proper contact is made between a portion of the sleeve 104 and the top portions 108a, 110b of the housing and cover.

When the handle is moved to create a contact position for the switch 100, a portion of the sleeve 104 contacts a portion of the housing 108 or cover 110 at mating area 215 as illustrated in FIG. 2B. As such, the sleeve 204 compresses to store enough energy to provide a force upon decompression to drive the handle 102 back to the neutral position of FIG. 2A.

In addition to providing force to return the handle to the neutral position, the sleeve 104 may also provide overload protection for the contact closures 114a, 114b, 114c, 114d. Overload protection can be provided since the sleeve 114 material, e.g., elastomeric material, may act like an insulator to electrical current flow. Such overload protection may be achieved independently or in addition to the return force. In addition, the two criteria can be independently adjusted and controlled by a different portion of the switch 100.

Although the illustrated embodiment of FIG. 1 includes an sleeve 104 to provide tactile feel and a snap return to neutral position, these design features may be met with other energy storage elements coincident with the axis of the handle 102. For instance, a spring can be coaxially disposed about an axis of the handle 102 such that movement of the handle to a contact position causes the spring to be compressed and energy to be stored in the spring, e.g., by a plunger forcing the spring against a cam surface on the housing of the switch 100.

According to another aspect of the invention, by splitting the housing 108 and cover 110 on the axis illustrated in FIG. 1, design features to captivate the joystick ball and provide "+" tracking to the handle can be incorporated in the same two parts while maintaining design independence.

Also, the use of 90 degree offset microswitches 130a, 130b, 130c, 130d, aligns the contact closures 114a, 114b, 114c, 114d with the actuation motion, and eliminates the need to translate the actuation motion (in positive and negative x and y directions) to the axis perpendicular to the PCB or contact closure 114a, 114b, 114c, 114d.

It is to be understood that the embodiments that have been described herein are but some of the several which utilize this invention and are set forth here by way of illustration, but not of limitation. It is obvious that many other embodiments, which will be readily apparent to those skilled in the art may be made without departing materially from the spirit and scope of the invention.

What is claimed is:

1. A stalk switch comprising:
a handle having a neutral position and at least one contact position;
a housing disposed around said handle to form at least a portion of an exterior surface of said switch, said handle further comprising an extended portion extending from said exterior surface; and
a sleeve disposed about said extended portion of said handle and adjacent said exterior surface, said sleeve configured to contact said exterior surface to store energy when said handle is in said at least one contact position and to release said energy to provide a force to drive said handle to said neutral position, said sleeve being removed from contact with said exterior surface when said handle is in said neutral position.

2. The stalk switch of claim 1, wherein said sleeve comprises an elastomeric material.

3. The stalk switch of claim 2, wherein said elastomeric material comprises urethane.

4. The stalk switch of claim 2, wherein said elastomeric material comprises butadiene rubber.

5. The stalk switch of claim 1, said switch further comprising:
at least one contact close associated with at least one microswitch, and wherein at portion of said handle contacts said least one contact closure when said handle is in said at least one contact position.

6. The stalk switch of claim 5, wherein said handle has a plurality of said contact positions and wherein said switch comprises a plurality of said contact closures, said handle being in contact with an associated one of said contact closures in each of said plurality of contact positions.

7. The stalk switch of claim 6, wherein said contact closures are disposed circumferentially around said handle.

8. The stalk switch of claim 7, wherein each of said contact closet is spaced by 90 degrees from an adjacent one of said contact closures.

9. A stalk switch comprising:
a handle having a neutral position and at least on contact position;
a housing and a cover disposed around said handle to form a exterior surface of the stalk switch, said handle further comprising an extended portion extending from said exterior surface; and
an elastomeric sleeve molded over said extended portion of said handle and adjacent said surface, said elastomeric sleeve configured to contact said exterior surface to store energy when said handle is in said at least one contact position and to release said energy to provide a force to drive said handle to said neutral position, said sleeve being removed from contact with said exterior surface when said handle is in said neutral position.

10. The stalk switch of claim 9, said switch further comprising:
at least one contact closure associated with at least one microswitch, and wherein at portion of said handle contacts said at least one contact closure when said handle is in said at least one contact position.

11. The stalk switch of claim 10, wherein said handle has a plurality of said contact positions and wherein said switch comprises a plurality of said contact closures, said handle being in contact with an associated one of said contact closures in each of said plurality of contact positions.

12. The stalk switch of claim 11, wherein said contact closures are disposed circumferentially around said handle.

13. The stalk switch of claim 12, wherein each of said contact closures is spaced by 90 degrees from an adjacent one of said contact closures.

* * * * *

UNITED STATES PATENT AND TRADEMARK OFFICE
CERTIFICATE OF CORRECTION

PATENT NO. : 6,844,510 B2
DATED : January 18, 2005
INVENTOR(S) : Prouty et al.

It is certified that error appears in the above-identified patent and that said Letters Patent is hereby corrected as shown below:

<u>Title page,</u>
Item [73], Assignee, delete the word "Stonebridge" and insert the word
-- Stonebridge --.

<u>Column 4,</u>
Line 14, delete the word "close", and insert the word -- closure --;
Line 16, after the word "said", insert the word -- at --;
Line 26, delete the word "closet", and insert the word -- closures --;
Line 29, delete the word "on", and insert the word -- one --;

Signed and Sealed this

Twelfth Day of April, 2005

JON W. DUDAS
*Director of the United States Patent and Trademark Office*